(12) United States Patent
Rife

(10) Patent No.: US 6,220,649 B1
(45) Date of Patent: Apr. 24, 2001

(54) CLOSURE PANEL ASSEMBLY FOR A MOTOR VEHICLE

(75) Inventor: Isaac E. Rife, Winamac, IN (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/374,927

(22) Filed: Aug. 16, 1999

(51) Int. Cl.⁷ ............................................. B62D 25/10
(52) U.S. Cl. .......................... 296/146.12; 296/146.8; 296/51
(58) Field of Search ...................... 296/146.8, 146.11, 296/146.12, 51

(56) References Cited

U.S. PATENT DOCUMENTS

| | | | |
|---|---|---|---|
| 2,929,528 | 3/1960 | Hoag et al. | 217/60 |
| 2,936,195 | 5/1960 | Schutte | 296/106 |
| 3,387,406 | 6/1968 | Coker et al. | 49/192 |
| 3,398,985 | 8/1968 | Rhoades | 296/57 |
| 3,408,100 | 10/1968 | McKey | 292/216 |
| 3,454,299 | 7/1969 | Hewitt et al. | 296/50 |
| 3,567,274 | 3/1971 | Kaptur, Jr. et al. | 296/50 |
| 3,612,601 | 10/1971 | Himka et al. | 296/51 |
| 3,623,764 | 11/1971 | Jacobus | 296/50 |
| 3,749,440 | 7/1973 | Lathers | 296/51 |
| 4,076,301 | 2/1978 | Gergoe | 296/50 |
| 4,688,844 * | 8/1987 | Hirose et al. | 296/51 X |
| 5,035,449 | 7/1991 | Shiratori et al. | 292/48 |
| 5,295,374 | 3/1994 | Bender et al. | 70/208 |
| 5,761,849 | 6/1998 | Tokuno | 49/193 |

FOREIGN PATENT DOCUMENTS

| | | |
|---|---|---|
| 3423610 A1 | 1/1986 | (DE) . |
| 401032921 * | 2/1989 | (JP) .................. 296/146.8 |

* cited by examiner

*Primary Examiner*—Joseph D. Pape
(74) *Attorney, Agent, or Firm*—Roland A. Fuller, III

(57) ABSTRACT

A closure panel assembly for a motor vehicle includes an upper member and a lower member. In a first mode, the upper and lower members are rigidly interconnected and the closure panel assembly is permitted to pivot about an upper pivot axis adjacent an upper edge of the upper member. In a second mode, the upper and lower members are free to move relative to one another. The upper member is permitted to independently pivot about the upper pivot axis. The lower member is permitted to independently pivot about a lower pivot axis adjacent a lower edge of the lower member.

13 Claims, 3 Drawing Sheets

CLOSURE PANEL ASSEMBLY FOR A MOTOR VEHICLE

BACKGROUND OF THE INVENTION

1. Technical Field

The present invention generally pertains to motor vehicles. More particular, the present invention pertains to a closure panel assembly for a motor vehicle. More specifically, but without restriction to the particular embodiment and/or use which is shown and described for purposes of illustration, the present invention relates to a closure panel assembly for a motor vehicle having an upper member and a lower member. In a first mode of closure panel assembly operation, the upper and lower members are rigidly interconnected and the closure panel assembly is permitted to pivot about an upper pivot axis adjacent an upper edge of the upper member. In a second mode, the upper and lower members are free to move relative to one another. The upper member is permitted to independently pivot about the upper pivot axis. The lower member is permitted to independently pivot about a lower pivot axis adjacent a lower edge of the lower member.

2. Discussion

Motor vehicles such as minivans, sport utility vehicle, station wagons and the like define a rear opening which is accessible through a closure panel. In minivans, for example, the closure panel is typically a liftgate mounted to the vehicle body for articulation about an upper pivot axis. With sport utility vehicles and station wagons, the closure panel is typically a tailgate mounted to the body of the vehicle for articulation about a lower pivot axis. Such vehicles frequently incorporate a glass panel which cooperates with the tailgate to close the rear opening and which may be independently articulated about an upper pivot axis.

A need exists in the relevant art for a closure panel which may selectively function in a manner similar to a conventional liftgate or in a manner similar to a conventional tailgate.

SUMMARY OF THE INVENTION

It is a general object of the present invention to provide a closure panel assembly for a motor vehicle which functions in various modes depending on user preference.

It is another object of the present invention to provide a closure panel assembly for a motor vehicle including an upper member and a lower member operative in a first mode in which the lower member may be rigidly coupled to the upper member for common rotation about upper hinges and operative in a second mode in which the lower member may be independently rotated about lower hinges.

In one form, the present invention provides a closure panel assembly for providing access through an opening in a body of a motor vehicle. The closure panel assembly includes an upper member and a lower member. The upper member is adapted to be coupled to a body of the motor vehicle adjacent an upper edge of the opening for articulation about an upper pivot axis. The lower member is adapted to be removably, rotatably coupled to the upper member and rotatably coupled to the body of the motor vehicle adjacent a lower edge of the opening for articulation about a lower pivot axis. Additionally, the lower member is rigidly coupled to the upper member allowing for rotation of both upper and lower member components about an upper pivot axis.

In another form, the present invention provides additional benefits and advantages which will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
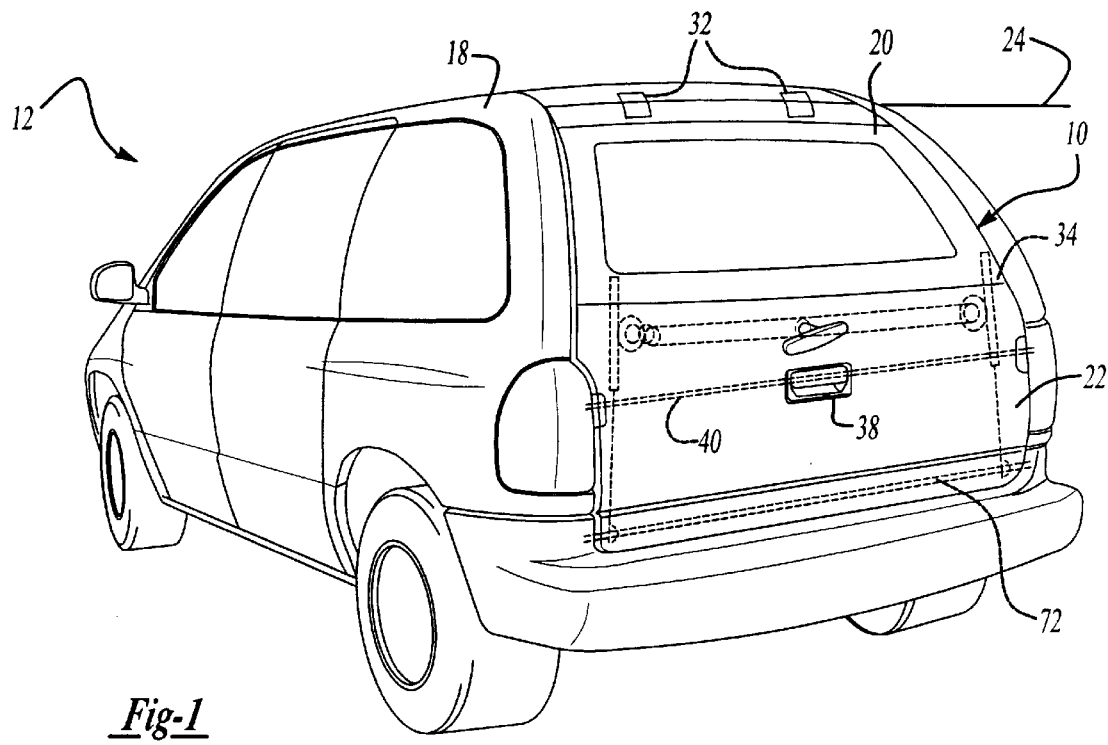
FIG. 1 is a perspective view of an exemplary motor vehicle incorporating a closure panel assembly constructed in accordance with the teachings of a preferred embodiment of the present invention.

With initial reference to FIG. 1 of the drawings, a closure panel assembly constructed in accordance with the teachings of the preferred embodiment of the present invention is illustrated. The closure panel assembly is generally identified in the drawings with reference numeral 10 and is shown operatively associated with an exemplary motor vehicle 12. The exemplary motor vehicle is illustrated as a minivan 12, such as the type manufactured by the assignee of the subject application. It will become apparently below, that the teachings of the present invention are not limited to the particular vehicle or type of vehicle shown in the drawings. Rather, the teachings of the present invention are applicable for any type of motor vehicle including a closure panel for selectively providing access through a rear opening 16 in a body 18 of the vehicle 12.

Figure 2:
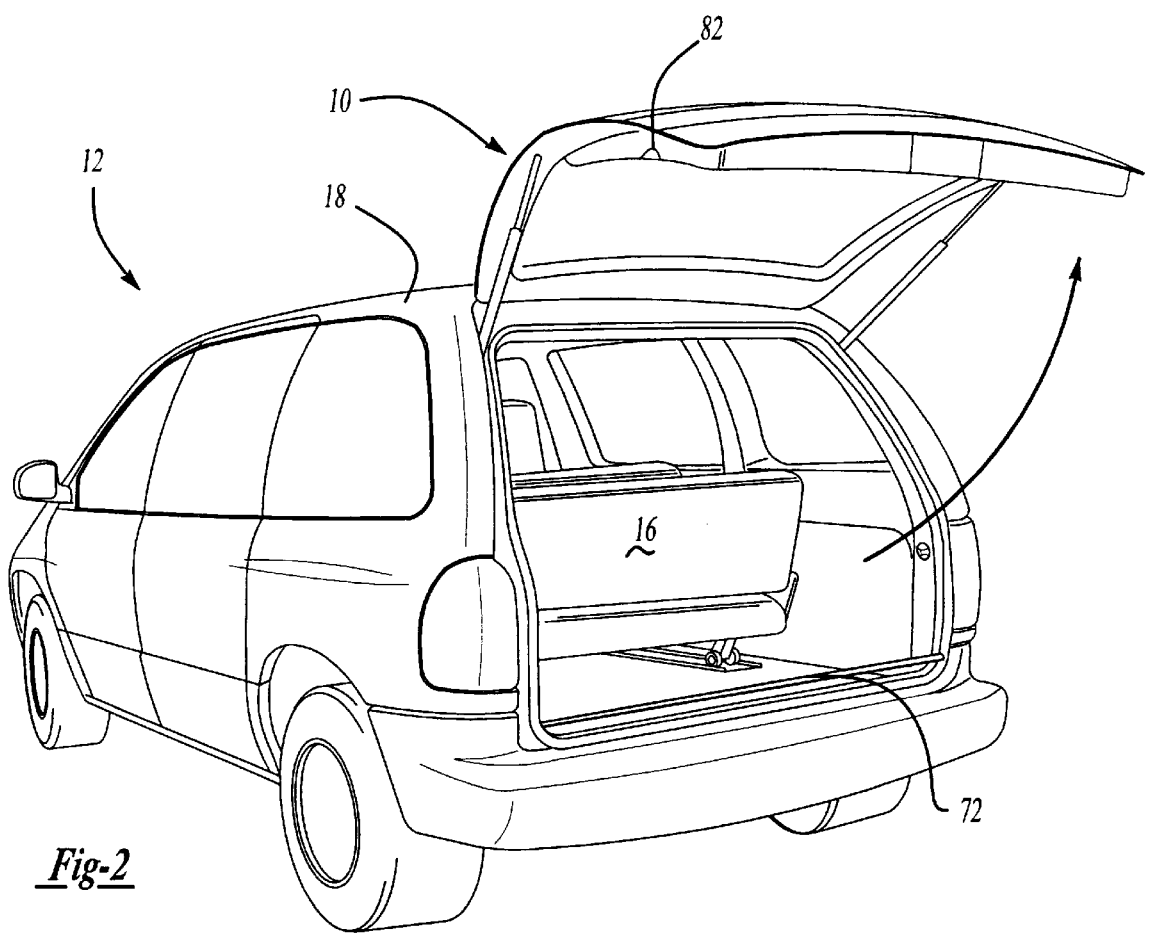
FIG. 2 a perspective view similar to FIG. 1, illustrating the closure panel assembly operating in a first mode, with upper and lower members of the tailgate assembly rigidly interconnected and jointly articulated about an upper pivot axis to an open position.
Figure 3:
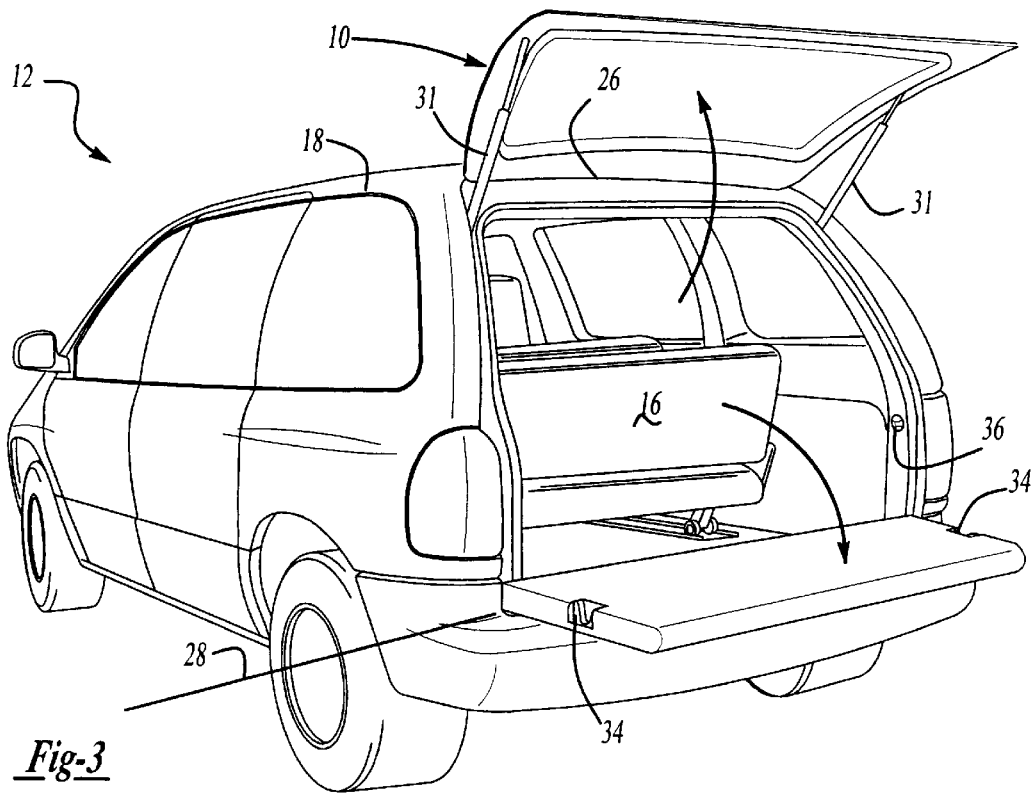
FIG. 3 is a perspective view similar to FIG. 1, illustrating the closure panel assembly operating in a second mode, with the upper member independently pivoted about the upper pivot axis and the lower member independently pivoted about a lower pivot axis.
Figure 4:
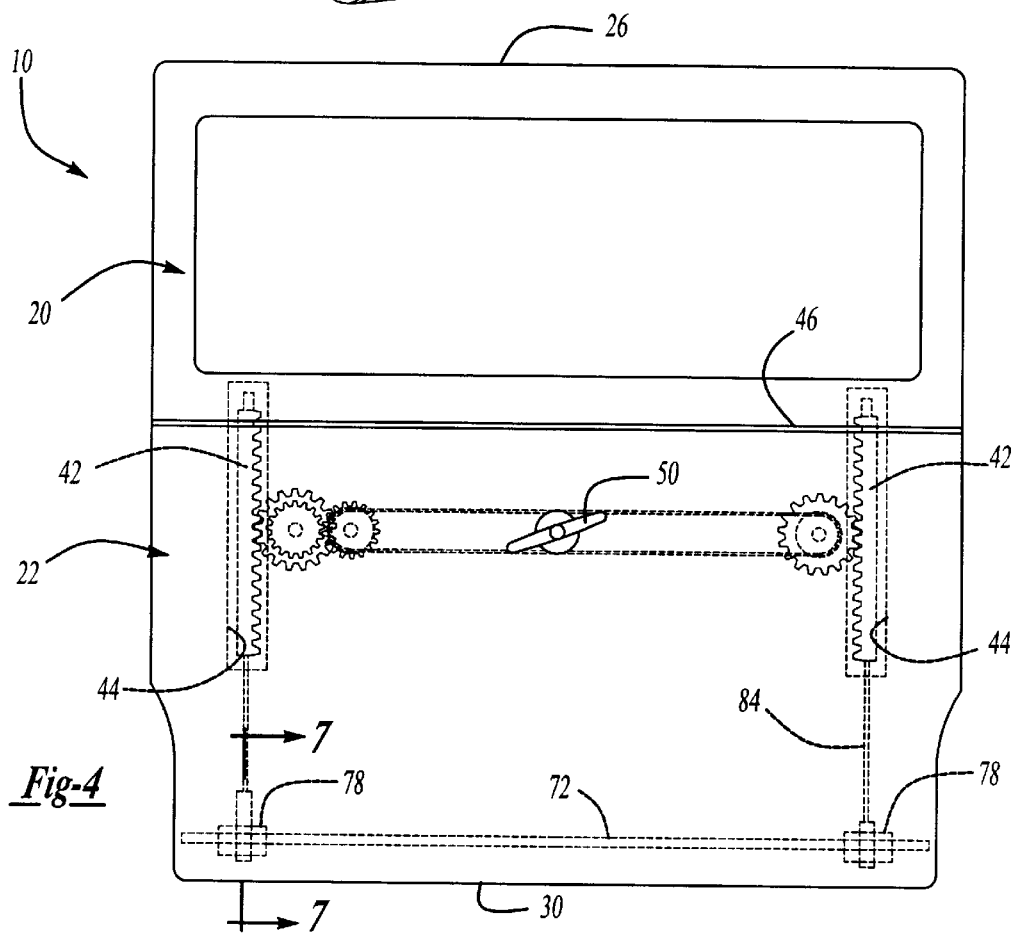
FIG. 4 is a rear view of the tailgate assembly of FIG. 1.

With continued reference to FIG. 1 and additional reference to FIGS. 2 through 4, the closure panel assembly 10 of the present invention is generally shown to included an upper member 20 and a lower member 22. In a manner to be discussed further below, the upper and lower members 20 and 22, may be selectively, rigidly interconnected such that they may be independently or jointly articulated relative to the vehicle body 18. In a first mode of operation of the closure panel assembly 10 (shown specifically in FIG. 2), the upper and lower members 20 and 22 are rigidly coupled or interconnected and the closure panel assembly 10 is permitted to pivot about an upper pivot axis 24 which is adjacent an upper edge 26 of the upper member 20. The closure panel assembly 10 is supported between the open and closed positions in a conventional manner by a pair of pneumatic struts 31. In a second mode of operation of the closure panel assembly 10 (shown specifically in FIG. 3), the upper and lower members 20 and 22 are decoupled to permit independent articulation relative to the vehicle body 18. In this regard, the upper member 20 is permitted to independently pivot about the upper pivot axis 24. The lower member 22 is permitted to independently pivot about a lower pivot axis 28 which adjacent a lower edge 30 of the lower member 22.

Prior to addressing the specific structure and function of the present invention, conventional aspects of the closure panel assembly 10 will be described. In this regard, the closure panel assembly 10 is conventionally attached to the vehicle body 18 for articulation about the upper pivot axis 24 through a pair of hinges 32 (shown in phantom in FIG. 1). The closure panel assembly 10 may articulate about the upper pivot axis 24 between an open position (shown in FIG. 2) and a closed position (shown in FIG. 1). In the closed position, the closure panel assembly 10 is retained by a pair of conventional latches 34 carried by the lower member 22 of the closure panel assembly 10. The latches 34 are adapted to engage associated strikers 36 carried by the vehicle body 18. The latches 34 are conventionally controlled by an operating handle 38 through control linkages 40.

The present invention will now be further described with continued reference to FIGS. 1–4 and additional reference to FIGS. 5–8. To provide means for rigidly coupling the upper and lower members 20 and 22 of the closure panel assembly 10, the closure panel assembly 10 includes a pair of locking members 42. The locking members 42 are each disposed within vertical channels 44 defined by the upper and lower members 20 and 22 which bridge an interface 46 between the upper and lower members 20 and 22. The locking members 42 are vertically translatable within the channels 44 between an upper position and a lower position. In the lower position, the upper and lower members 20 and 22 may be moved independently. In the upper position, the upper and lower members 20 and 22 are coupled for coordinated movement.

To provide means for selectively coupling the upper and lower members 20 and 22, the closure panel assembly 10 includes a control arrangement 48 operated by a release knob 50. The control arrangement 48 is preferably carried by the lower member 22 but may alternatively be carried by the upper member 20. In the exemplary embodiment illustrated, the release knob 50 is interconnected to a drive gear 52 through a shaft 54. The drive gear 52 is interconnected with a pair of driven gears 56a and 56b, each of which is associated with one of the locking members 42. Further in the exemplary embodiment, the locking members are rack members 42 including a plurality of teeth meshingly engaged with teeth of the associated driven gear 56a or 56b.

In the embodiment illustrated, a set of intermediate gears 58 is provided between one of the driven gears 56a and the drive gear 52. The other driven gear 56b is mounted for common rotation about a pivot shaft 60 with an intermediate gear 62. The pivot shaft 60 is supported in a conventional manner by the lower member 22 of the closure panel assembly 10. The intermediate gears 58 are shown to include a first intermediate gear 58a and a second intermediate gear 58b mounted on a common pivot shaft 64 which is supported by the lower member 20. A third intermediate gear 58c is mounted on a common pivot shaft 66 with the associated driven gear 56. The second and third intermediate gears 58b and 58c are meshingly engaged such that rotation of the first intermediate gear 58a in a first direction causes corresponding opposite rotation of the associated driven gear 56.

Figure 5:
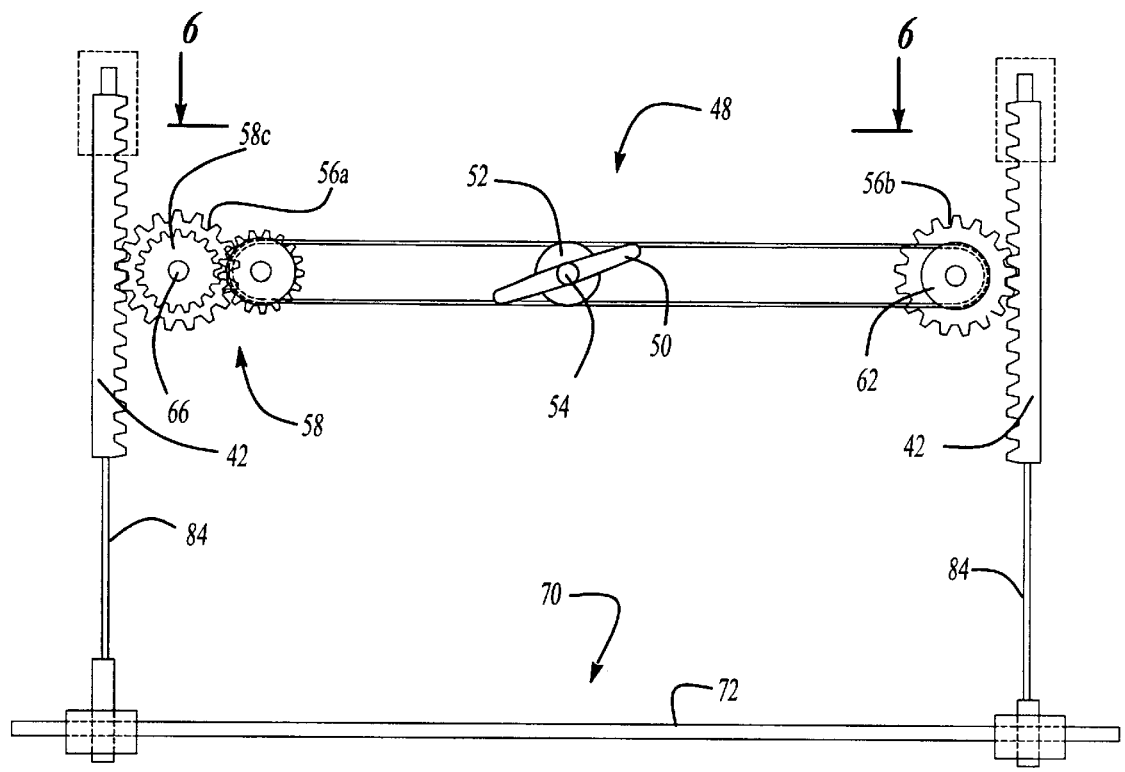
FIG. 5 is a simplified front view of the arrangement for selectively coupling the lower member and the upper member of the closure panel assembly of FIG. 1.
Figure 6:
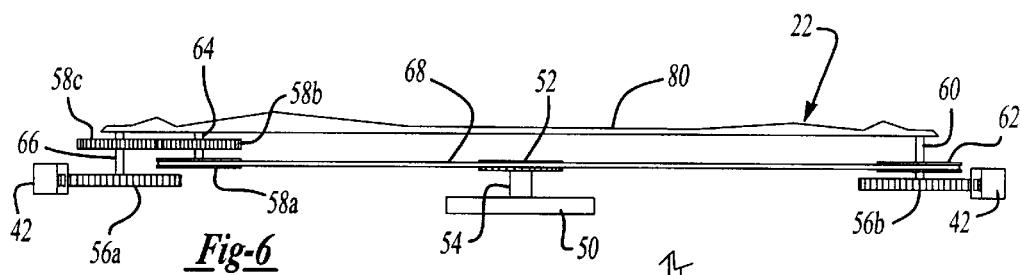
FIG. 6 is a simplified top view of the arrangement for selectively coupling the lower member and the upper member of FIG. 5 shown in the direction of arrows 6 in FIG. 5.
Figure 7:
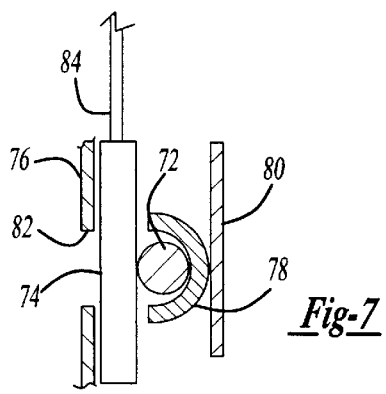
FIG. 7 is a cross-sectional view taken along the line 7—7 of FIG. 4, illustrating the shaft retaining mechanism of the closure panel assembly in a closed position.

A continuous drive chain 68 interconnects the drive gear 52, the intermediate gear 62 and the intermediate gears 58. Rotation of the release knob 50 in a first direction (clockwise as shown in FIG. 5) causes rotation of the driven gears 56 to translate the associated locking members 42 downward to their lower positions and thereby decouple the upper and lower members 20 and 22 of the closure panel assembly 10. Conversely, rotation of the release knob 50 in a second direction (counterclockwise as shown in FIG. 5) causes the driven gears 56 to translate the associated locking members 42 upward to their upper positions which results in coupling of the upper and lower members and permits relative movement between the upper and lower members 20 and 22 of the closure panel assembly 10.

To provide means for releasably and rotatably coupling of the lower member 22 of the closure panel assembly 10 to the vehicle body 18, the closure panel assembly 10 includes a control arrangement 70 including an elongated shaft 72 and a pair of closure members or plates 74. As shown particularly in the cross-sectional views of FIGS. 7 and 8, and in the FIG. 5 view, the shaft 72 horizontally extends across the length of the lower member 22. The shaft 72 is non-rotatably supported within adjacent portions of the vehicle body 18.

Figure 8:
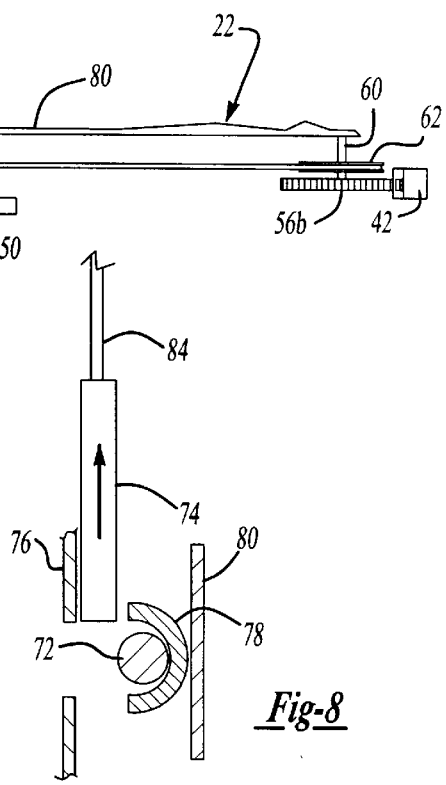
FIG. 8 is a cross-sectional view similar to FIG. 7, illustrating the shaft retaining mechanism in an open position.

The closure plates 74 are each linearly translatable between a closed position (shown in FIG. 7) and an open position (shown in FIG. 8). When the closure panel assembly 10 is closed and the closure plates 74 are in their closed positions, the closure plates 74 are located between an outer panel 76 of the closure panel assembly 10 and the shaft 72. The shaft 72 is received within a pair of pivot brackets 78. The pivot brackets 78 are welded or otherwise fixedly secured to an outer panel 80 of the closure panel assembly 10.

When the closure plates 74 are in their open or upper positions, the lower member 22 is not retained by the shaft 72. As shown in the cross-sectional views of FIGS. 7 and 8, the shaft 72 is aligned with a transversely extending opening 82 in the inner panel 76. When the closure plates are lowered to their closed or lower positions, relative movement of the lower member 22 to the shaft 72 is prevented and the lower member 22 may pivot about the lower pivot axis 28 which is defined by the shaft 72.

In the exemplary embodiment illustrated, each of the closure plates 74 is connected to an associated one of the locking members 42 through a linkage 84. Accordingly, when the locking members 42 are translated to their upward positions to thereby couple the upper and lower members 20 and 22 for common rotation about the upper pivot axis 24, the arrangement 70 permits the lower edge 30 of the lower member 22 to be displaced from the vehicle body 18. Conversely, when the locking members 42 are downwardly translated, the closure plates 74 and pivot brackets 78 rotatably capture the shaft 72 to allow articulation of the lower member 22 about the shaft 72.

It will be understood by those skilled in the an that the closure panel assembly 10 of the present invention may be controlled manually or electronically. Electronic control may be accomplished in an otherwise conventional manner through remote activation or by a switch (not shown) in the passenger compartment. It will be also understood that alternate arrangements to those illustrated may be employed for interconnecting the latching mechanisms (e.g. the latches 34 and associated strikers 36) and the associated control mechanisms (i.e. the handle 38 and the release knob 50). It will be understood by those skilled in the art that in certain applications it may be desirable to incorporate a mechanism to prevent the upper and lower members 20 and 22 from separating when the closure panel assembly 10 is articulated as a unit about the upper pivot axis 24. Such a mechanism may incorporate a hook or other structure for linking the upper and lower members 20 and 22. Alternatively, such structure may incorporate a latch or similar structure for preventing rotation of the driven gears 56.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A closure panel assembly for providing access through an opening in a body of a motor vehicle comprising:

an upper member;

a lower member;

the upper member adapted to be coupled to a body of the motor vehicle adjacent an upper edge of the opening for articulation about an upper pivot axis the lower member being releasably coupled to the upper member for common articulation with the upper member about the upper pivot axis, and adapted to be releasably coupled to the body of the motor vehicle adjacent a lower edge of the opening for rotation about a lower pivot axis; and, a pair of locking members movable between a first position for rigidly coupling the upper and lower members and a second position for decoupling the upper and lower members, the pair of locking members being linearly translatable within vertical channels defined by the upper and lower members and bridge an interface between the upper and lower members.

2. The closure panel assembly for a motor vehicle of claim 1, further comprising a control arrangement including a manually rotatable control member for moving the locking members between the first and second positions.

3. The closure panel assembly for a motor vehicle of claim 2, wherein the control arrangement is carried by the lower member.

4. A closure panel assembly for providing access through an opening in a body of a motor vehicle, comprising:

an upper member;

a lower member; and the upper member adapted to be coupled to a body of the motor vehicle adjacent an upper edge of the opening for articulation about an upper pivot axis, the lower member being releasably coupled to the upper member for common articulation with the upper member about the upper pivot axis, and adapted to be releasably coupled to the body of the motor vehicle adjacent a lower edge of the opening for rotation about a lower pivot axis;

an elongated shaft adapted to be non-releasably carried by the body and received within a recess defined in the lower member; and a pair of closure plates movable between first and second position for selectively retaining the lower member to the elongated shaft.

5. The closure panel assembly for a motor vehicle of claim 4, wherein the elongated shaft defines the lower pivot axis.

6. A motor vehicle comprising:

a body defining a body opening;

a closure panel assembly for providing access through the opening, the closure panel assembly including:

an upper member coupled to the body of the motor vehicle adjacent an upper edge of the body opening for articulation about an upper pivot axis;

a lower member releasably coupled to the upper member and releasably coupled to the body of the motor vehicle adjacent a lower edge of the body opening for articulation about a lower pivot axis;

a pair of locking members movable between a first position for rigidly coupling the upper and lower members and a second position for decoupling the upper and lower members, the pair of locking members being linearly translatable within the vertical channels defined by the members and bridge an interface between the upper and lower members.

7. The motor vehicle of claim 6, further comprising a control arrangement including a manually rotatable control member for moving the locking members between the first and second positions.

8. The motor vehicle of claim 7, wherein the control arrangement is carried by the lower member.

9. A motor vehicle, comprising:

a body defining a body opening;

a closure panel assembly for providing access through the opening, the closure panel assembly including:

an upper member coupled to the body of the motor vehicle adjacent an upper edge of the body opening for articulation about an upper pivot axis;

a lower member releasably coupled to the upper member and releasably coupled to the body of the motor vehicle adjacent a lower edge of the body opening for articulation about a lower pivot axis; and an elongated shaft non-releasably attached to one of the body and the lower member and releasably attached to the other of the body and the lower members.

10. The motor vehicle of claim 9, wherein the elongated shaft defines the lower pivot axis.

11. A closure panel assembly for providing access through an opening in a body of a motor vehicle comprising:

an upper member;

a lower member;

the closure panel assembly including an upper member coupled to the body and a lower member coupled to the body;

the closure panel assembly operative in a first mode and a second mode such that when the closure panel assembly is operating in the first mode the upper and lower members are coupled to the body for common rotation about an upper pivot axis adjacent on upper edge of the body opening, and such that when the closure panel assembly is operated in the second mode the lower member is coupled to the body for rotation about a lower pivot axis adjacent a lower edge of the body opening and the upper member is coupled to the body for rotation about the upper pivot axis; and, a pair of locking members movable between a first position for rigidly coupling the upper and lower members and a second position for decouping the upper and lower members, the pair of locking members being linearly translatable within vertical channels defined by the upper and lower members and bridge an interface between the upper and lower members.

12. The motor vehicle of claim 11, further comprising a control arrangement including a manually rotatable control member for moving the locking members between the first and second positions.

13. The motor vehicle of claim 12, wherein the control arrangement is carried by the lower member.

* * * * *